(12) United States Patent
Dietl et al.

(10) Patent No.: US 11,846,697 B2
(45) Date of Patent: Dec. 19, 2023

(54) TIME OF FLIGHT ABSOLUTE POSITION MEASUREMENT

(71) Applicant: TEXAS INSTRUMENTS INCORPORATED, Dallas, TX (US)

(72) Inventors: Markus Dietl, Munich (DE); Siva RaghuRam Prasad Chennupati, Unterschleissheim (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 180 days.

(21) Appl. No.: 16/997,979

(22) Filed: Aug. 20, 2020

(65) Prior Publication Data
US 2020/0379098 A1  Dec. 3, 2020

Related U.S. Application Data

(63) Continuation of application No. 15/857,721, filed on Dec. 29, 2017, now Pat. No. 10,788,577.

(51) Int. Cl.
| | | |
|---|---|---|
| *G01S 13/40* | (2006.01) | |
| *H02K 7/14* | (2006.01) | |
| *G01S 13/88* | (2006.01) | |
| *H02K 41/02* | (2006.01) | |
| *H02K 11/215* | (2016.01) | |
| *H02K 11/225* | (2016.01) | |

(52) U.S. Cl.
CPC .............. *G01S 13/40* (2013.01); *G01S 13/88* (2013.01); *H02K 7/14* (2013.01); *H02K 41/02* (2013.01); *H02K 11/215* (2016.01); *H02K 11/225* (2016.01)

(58) Field of Classification Search
CPC ......... G01S 13/40; G01S 13/88; H02K 41/02; H02K 7/14; H02K 11/225; H02K 11/215
USPC ....................................................... 310/12.19
See application file for complete search history.

(56) References Cited

U.S. PATENT DOCUMENTS

| | | | |
|---|---|---|---|
| 5,003,260 A | 3/1991 | Auchterlonie | |
| 5,710,514 A | 1/1998 | Crayton | |
| 6,367,565 B1 * | 4/2002 | Hall ..................... | E21B 41/0085 175/50 |
| 6,385,268 B1 | 5/2002 | Fleming | |
| 6,484,620 B2 * | 11/2002 | Arshad .................... | G01S 17/10 91/1 |
| 6,642,710 B2 * | 11/2003 | Morrison ................. | G01B 7/02 324/207.17 |
| 6,722,260 B1 * | 4/2004 | Brown ..................... | G01D 5/48 91/1 |

(Continued)

*Primary Examiner* — Alex W Mok
(74) *Attorney, Agent, or Firm* — John R. Pessetto; Frank D. Cimino

(57) ABSTRACT

A linear actuator includes a piston, a transmitter, and a receiver. The piston is configured to linearly extend and retract (such as within a cover tube). The transmitter is configured to generate a transmit electromagnetic waveform and direct the transmit electromagnetic waveform along a length of the piston. The receiver is configured to receive a return electromagnetic waveform that includes the transmit electromagnetic waveform after travelling to an extended end of the piston and returning to the receiver and determine a position of the piston based on a phase difference between the transmit electromagnetic waveform and the return electromagnetic waveform.

14 Claims, 3 Drawing Sheets

(56) References Cited

U.S. PATENT DOCUMENTS

| | | | |
|---|---|---|---|
| 6,769,349 B2 * | 8/2004 | Arshad | ............... G01S 7/4818 91/1 |
| 2002/0170424 A1 | 11/2002 | Brown | |
| 2004/0135992 A1 | 7/2004 | Munro | |
| 2008/0048905 A1 | 2/2008 | McEwan | |
| 2009/0058430 A1 | 3/2009 | Zhu | |
| 2012/0082247 A1 | 4/2012 | Ganger | |
| 2012/0212366 A1 | 8/2012 | Alalusi | |
| 2012/0303210 A1 | 11/2012 | Matsui | |
| 2012/0316828 A1 | 12/2012 | Buechler | |
| 2014/0159961 A1 | 6/2014 | Ware | |
| 2014/0300516 A1 | 10/2014 | Min | |
| 2016/0169310 A1 | 6/2016 | Erickson | |
| 2016/0326868 A1 | 11/2016 | Wisniewski | |

* cited by examiner

TIME OF FLIGHT ABSOLUTE POSITION MEASUREMENT

CROSS REFERENCE TO RELATED APPLICATION(S)

This continuation application claims priority to U.S. patent application Ser. No. 15/857,721, filed Dec. 29, 2017, which application is incorporated herein by reference in its entirety.

BACKGROUND

Linear actuators are actuators that create linear motion (e.g., motion in a straight line). For example, an electric motor may cause a spindle (screw) to rotate. The rotation of the spindle drives a piston out from a cover tube of the actuator or pulls the piston into the cover tube in a linear direction. In other words, the rotation of the spindle causes the piston to either extend or retract from the cover tube.

SUMMARY

In accordance with at least one aspect of the disclosure, a linear actuator includes a piston, a transmitter, and a receiver. The piston is configured to linearly extend and retract (such as within a cover tube). The transmitter is configured to generate a transmit electromagnetic waveform and direct the transmit electromagnetic waveform along a length of the piston. The receiver is configured to receive a return electromagnetic waveform that includes the transmit electromagnetic waveform after travelling to an extended end of the piston and returning to the receiver and determine a position of the piston based on a phase difference between the transmit electromagnetic waveform and the return electromagnetic waveform.

In another illustrative aspect of the disclosure, a receiver includes a delay detector and a processor. The delay detector is configured to receive a return electromagnetic waveform that includes a transmit electromagnetic waveform after travelling to an extended end of a piston of a linear actuator. The delay detector is also configured to determine a phase difference between the transmit electromagnetic waveform and the return electromagnetic waveform. The processor is configured to determine a position of the piston based on the phase difference.

Yet another illustrative aspect of the disclosure is a method of determining a position in a linear actuator. The method includes generating a transmit electromagnetic waveform with a frequency corresponding to a time of flight for the transmit electromagnetic waveform to travel a maximum displacement of the piston. The method also includes directing the transmit electromagnetic waveform along a length of the piston. The method also includes receiving a return electromagnetic waveform that includes the transmit electromagnetic waveform after travelling to an extended end of the piston and returning to a receiver. The method also includes determining the position of the piston based on a phase difference between the transmit electromagnetic waveform and the return electromagnetic waveform.

BRIEF DESCRIPTION OF THE DRAWINGS

For a detailed description of various examples, reference will now be made to the accompanying drawings in which.

NOTATION AND NOMENCLATURE

Figure 1:
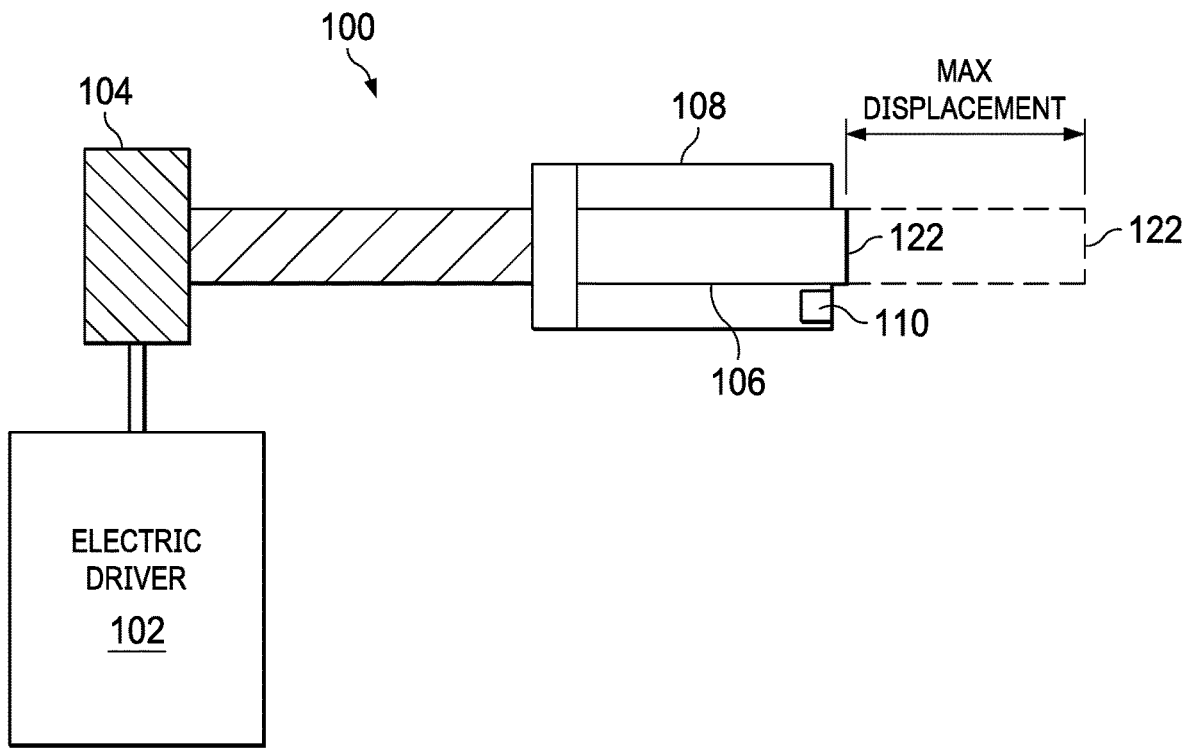
FIG. 1 shows an illustrative block diagram of a linear actuator in accordance with various examples.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various examples of the disclosure. Although one or more of these examples may be preferred, the examples disclosed should not be interpreted, or otherwise used, as limiting the scope of the disclosure, including the claims. In addition, one skilled in the art will understand that the following description has broad application, and the discussion of any example is meant only to be exemplary of that example, and not intended to intimate that the scope of the disclosure, including the claims, is limited to that example.

Linear actuators are actuators that create linear motion (e.g., motion in a straight line). For example, an electric driver can drive a piston along a linear path. For example, a motor may cause a spindle (screw) to rotate. In this example, the rotation of the spindle drives a piston out from a cover tube of the actuator or pulls the piston into the cover tube in a linear direction. In other words, the rotation of the spindle causes the piston to either extend or retract from the cover tube. In other examples, other types of electric drivers can drive the piston along the linear path. In some cases, it is desirable to determine the position of the piston with respect to the cover tube. For example, if the piston is 10 percent extended when power is lost, when power is regained, it is desirable to determine that the piston is 10 percent extended. If the actuator does not have an accurate position, stability of the system may be reduced.

Some linear actuators use limit switches, resistive sensors, inductive sensors, and/or magnetic sensors to determine the position of the piston. While limit switches can limit the piston from extending too far or retracting too much, the use of a limit switch does not provide the position of the piston if the piston is not fully retracted or fully extended. While resistive sensors can provide an absolute position of the piston, process, voltage, temperature (PVT) variations can cause the position measurement to lose reliability. Additionally, while inductive sensors and magnetic sensors also are capable of measuring absolute position of the piston, their size and cost limit their usability. Therefore, there is a need to develop a linear actuator that can determine absolute position of the piston in a reliable and cost effective manner.

In accordance with various examples, a linear actuator is provided that is capable of determining the absolute position of the piston utilizing a time of flight (TOF) of an electromagnetic waveform transmitted along the piston to an extended end of the piston. The position of the piston can be determined by comparing the phase difference between the transmitted electromagnetic waveform and the received electromagnetic waveform after the electromagnetic waveform has reached the extended end of the piston. By generating the electromagnetic waveform with a frequency that has a period that is two times the amount of time for the electromagnetic waveform to travel the maximum length of the piston (e.g., when the piston is fully extended), a detect circuit can compare the phase difference between the transmitted electromagnetic waveform and the received electromagnetic waveform to determine the position of the piston. Such a system provides flexibility, stability, and accuracy in piston position determination for the linear actuator.

FIG. 1 shows an illustrative block diagram of a linear actuator 100 in accordance with various examples. The linear actuator 100 includes, in an example, an electric driver 102, a spindle 104, a piston 106, a cover tube 108, and a piston position determination system 110. The electric driver 102 is configured to create mechanical energy to rotate spindle 104. In some examples, the electric driver 102 is a direct current (DC) motor; however, in other examples, the electric driver 102 is an alternating current (AC) motor. In yet still further examples, even though shown as an electric motor, other types of motors (e.g., mechanical) can also be utilized to turn the spindle 104.

As discussed above, the electric driver 102 rotates the spindle 104 which causes the piston 106 to linearly extend along the spindle 104. For example, when the spindle 104 rotates in one direction, in some examples, a nut (not shown) forces the piston 106 to linearly extend from the cover tube 108. When the spindle 104 rotates in the opposite direction, the nut causes the piston 106 to retract into the cover tube 108. In this way, the piston 106 linearly extends from and retracts into the cover tube 108 along the spindle 104. In other examples, any other device can cause the linear extension and/or retraction of the piston 106 from the cover tube 108. For example, the electric driver 102 can cause the linear extension of the piston 106 without the need and/or use of a spindle.

The cover tube 108 is a housing that houses the piston 106 when fully retracted and partially houses the piston 106 as the piston 106 linearly extends. The maximum displacement of the piston 106 (denoted by the dashed lines in FIG. 1), is the maximum extension of the piston 106 from the extended end 122 to the end of the cover tube 108.

The piston position determination system 110 is configured to determine the position of the piston 106 (e.g., how linearly extended is the piston 106 from a fully retracted state). In some examples, the piston position determination system 110 determines an absolute position of the piston 106 based on a TOF of an electromagnetic waveform (e.g., radio frequency (RF) signal) from the piston position determination system 110 to the extended end 122 of piston 106. Therefore, in some examples, the piston position determination system 110 is located at the end of the cover tube 108.

Figure 2:
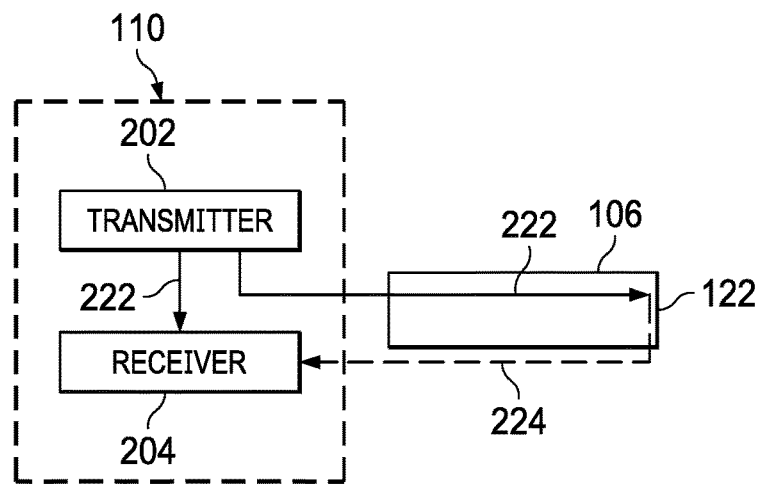
FIG. 2 shows an illustrative block diagram of a piston position determination system of a linear actuator in accordance with various examples.

FIG. 2 shows an illustrative block diagram of piston position determination system 110 in accordance with various examples. In an example, the piston position determination system 110 includes a transmitter 202 and a receiver 204. Transmitter 202 and receiver 204 can be implemented as a transceiver integrated circuit, or as separate integrated circuits (such as a transceiver chipset).

The transmitter 202 is configured to generate a transmit electromagnetic waveform 222 (e.g., a digital or analog RF signal) and direct the transmit electromagnetic waveform 222 along a length of the piston 106. In other words, the transmitter 202 transmits the transmit electromagnetic waveform 222 utilizing, in an example, the material of the piston 106 toward the extended end 122. Therefore, the piston 106 is, in an example, composed of a conductive material (e.g., a metal).

Once the transmit electromagnetic waveform 222 reaches extended end 122, the electromagnetic waveform returns toward the piston position determination system 110, in some examples, through a wire that is coupled to the piston 106 as return electromagnetic waveform 224. The receiver 204 is configured to receive the return electromagnetic waveform 224. In other words, the receiver 204 is configured to receive the transmit electromagnetic waveform 222 after travelling along the piston 106 to extended end 122 and returning to the receiver 204. The receiver 204 also is configured to directly receive the transmit electromagnetic waveform 222 from the transmitter 202. The receiver 204 then determines the position of the piston 106 based on a phase difference between the transmit electromagnetic waveform 222, received directly from the transmitter 202 (acting as a reference signal), and the return electromagnetic waveform 224, received from the extended end 122.

Figure 3:
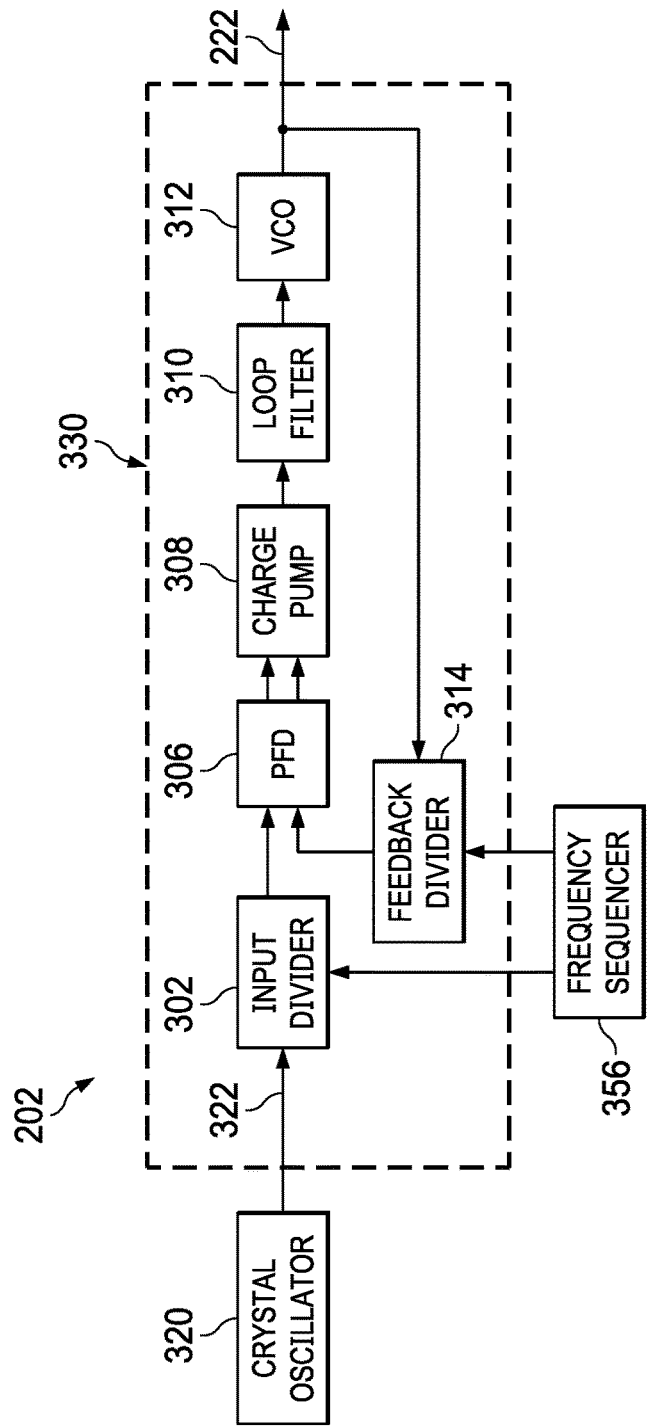
FIG. 3 shows an illustrative block diagram of a transmitter of a piston position determination system in accordance with various examples.

FIG. 3 shows an illustrative block diagram of transmitter 202 of piston position determination system 110 in accordance with various examples. In some examples, the transmitter 202 includes a crystal oscillator 320 and a phase-lock loop (PLL) 330. In other examples, the transmitter 202 includes a delayed-lock loop (DLL) instead of the PLL 330. In yet further examples, the transmitter 202 can include any circuitry to generate and direct the transmit electromagnetic waveform 222.

The PLL 330 includes, in an example, an input divider 302, a phase/frequency detector (PFD) 306, a charge pump 308, a loop filter 30, a voltage controlled oscillator (VCO) 312, and a feedback divider 314. A crystal oscillator 320 is configured, in an example, to generate an input signal 322 at predetermined frequency as input to the PLL 330. The input signal 322, in an example, is divided by input divider 302 to generate a PLL reference signal. The input divider 302 may include, in some examples, a dual-modulus divider, binary counters, or other circuitry that allows division of the input signal frequency by a programmable divisor coefficient which may be controllable by a frequency sequencer 356. In alternative examples, the input signal 322 is provided directly, without division to the PFD 306 as the reference signal.

VCO 312 is, in an example, an electronic oscillator configured to control oscillation frequency by a voltage input. Thus, the frequency of oscillation created is varied by the applied voltage. Therefore, the VCO 312 generates the transmit electromagnetic waveform 222 based on a control voltage provided by the loop filter 310. While shown internal to PLL 330 in FIG. 3, VCO 312 can be, in an example, external to the remaining components of the PLL 330 (e.g., VCO 312 can be on a separate chip than the other components of PLL 330). Because the divider coefficient is changeable and controllable, the frequency of the reference signal (e.g., the frequency of the reference signal) can be different at different times, so that the VCO 312 can generate the transmit electromagnetic waveform at different frequencies.

The output frequency of the VCO 312 is reduced by the feedback divider 314 and compared, by the PFD 306, to the reference signal. The feedback divider 314 includes, in some examples, a dual-modulus divider, binary counters, or other circuitry that allows division of the output signal frequency of the VCO 312 by a programmable divisor coefficient. The PFD 306 identifies differences in the phase and/or frequency of the output of the feedback divider 314 and the reference signal and generates signals that control the charge pump 308 responsive to the identified differences in phase and/or frequency. The charge pump 308 generates currents to charge and discharge one or more capacitors in the loop filter 310. The voltage across each of the capacitors form the control voltage applied to the VCO 312 for a given period of time. For example, if the PFD 306 determines that the reference frequency has a frequency that is greater than the frequency output by the feedback divider 314, the PFD 306 outputs signals that cause the charge pump 308 to drive a current into the loop filter 310, thereby, increasing the voltage across one of the capacitors and increasing the output frequency of the VCO 312, and thus, the frequency of the transmit electromagnetic waveform 222.

The frequency sequencer can determine and set the frequency scaling coefficients applied by the PLL 330. The frequency sequencer 356 can be implemented as a processor (e.g., a microcontroller, a general-purpose processor, etc.) that executes instructions retrieved from a storage device, or as dedicated hardware circuitry. The frequency sequencer 356 can compute the coefficients for the input divider 302 and/or feedback divider 314 based on a selected output frequency, can retrieve pre-computed coefficients from a table, etc. In other words, the division values of the input divider 302 and/or the feedback divider 314 are programmable and/or changeable by the frequency sequencer 356. Hence, the division values of the input divider 302 and/or the feedback divider 314 can vary leading to an ability to set and/or change the frequency of the transmit electromagnetic waveform 222.

In some examples, the PLL 330 (or DLL), and thus, the transmitter 202 is configured to generate the transmit electromagnetic waveform 222 at a frequency that corresponds with the maximum displacement of the piston 106. More particularly, the PLL 330 (or DLL) generates the transmit electromagnetic waveform 222 with a period that is double (to account for the fact that the signal travels to the extended end 122 and back to the receiver 204 as return electromagnetic waveform 224) the amount of time for the transmit electromagnetic waveform 222 to travel the maximum displacement of the piston 106 (e.g., the distance from the end of the cover tube 108 to the extended end 122 when the piston 106 is fully extended). For example, the transmit electromagnetic waveform 222 travels at approximately the speed of light. If the maximum displacement of the piston 106 is 30 cm (approximately 1 ft), the transmit electromagnetic waveform 222 will take approximately 1 ns to travel to the extended end 122. In this case, doubling the amount of time for the transmit electromagnetic waveform 222 to travel to the extended end 122 equals to 2 ns. Therefore, the period of the transmit electromagnetic waveform 222 is set to 2 ns. A 2 ns period equates to a frequency of 500 MHz. Thus, the PLL 330 (or DLL) generates a transmit electromagnetic waveform 222 at 500 MHz in this example. In other words, the amount of time for the transmit electromagnetic waveform 222 to travel the maximum displacement of the piston 106 is half the period of the transmit electromagnetic waveform 222.

Figure 4:
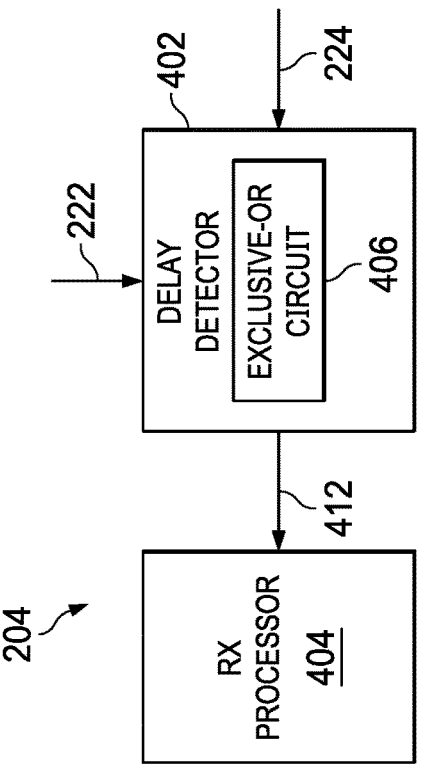
FIG. 4 shows an illustrative block diagram of a receiver of a piston position determination system in accordance with various examples.

FIG. 4 shows an illustrative block diagram of receiver 204 of the piston position determination system 110 in accordance with various examples. The receiver 204 includes, in an example, a delay detector 402 and a receiver processor 404. The delay detector 401 and receiver processor 404 can be implemented as a single integrated circuit, or as separate integrated circuits. Or, the processing function can be implanted in a system processor/controller, with a data communications link to the delay detector 402.

The delay detector 402 receives the transmit electromagnetic waveform 222 directly from the transmitter 202 and the return electromagnetic waveform 224 from the extended end 122. The delay detector 402 is configured, in an example, to determine a phase difference, in some examples using a phase detector (not shown), between the transmit electromagnetic waveform 222 and the return electromagnetic waveform 224. In some examples, the delay circuit 402 includes an analog-to-digital converter (ADC) to convert the transmit electromagnetic waveform 222 and the return electromagnetic waveform 224 from analog signals into digital signals. In an example, the delay detector includes an exclusive-or circuit 406 that performs an exclusive-or function on the transmit electromagnetic waveform 222 and the return electromagnetic waveform 224. Therefore, the exclusive-or circuit 406 generates a 0 (LOW signal) if the transmit electromagnetic waveform 222 is 1 (HIGH) and the return electromagnetic waveform 224 is 1 (HIGH) or if the transmit electromagnetic waveform 222 is 0 (LOW) and the return electromagnetic waveform 224 is 0 (LOW). The exclusive-or circuit 406 generates a 1 (HIGH) signal if the transmit electromagnetic waveform 222 is 1 (HIGH) and the return electromagnetic waveform 224 is 0 (LOW) or if the transmit electromagnetic waveform 222 is 0 (LOW) and the return electromagnetic waveform 224 is 1 (HIGH).

In some examples, the delay detector 402 generates an output voltage 412 that is indicative of the position of the piston 106 based on the output of the exclusive-or circuit 406. For example, an average output of the exclusive-or circuit 406 over a predetermined period of time (e.g., 10 ns) can be determined by the delay detector 402. In other words, the delay detector 402 can integrate the output of the exclusive-or circuit 402 over the predetermined period of time to determine an average exclusive-or circuit 406 output. If the output of the exclusive-or circuit 406 is 1 (HIGH) for the entire predetermined period of time, then the delay detector 402 generates an output voltage that is equal to the supply voltage VCC, thus, indicating that the piston 106 is in a maximum extension position (at its maximum displacement). However, if the output of the exclusive-or circuit 406 is 0 (LOW) for the entire predetermined period of time, then the delay detector 402 generates an output voltage that is equal to zero, thus, indicating that the piston 106 is fully retracted. Additionally, if the average output of the exclusive-or circuit 402 over the predetermined period of time is not 0 or 1 (e.g., somewhere between 0 and 1), then the output voltage 412 is a percentage of the supply voltage that is proportional to the percent of time within the predetermined period of time that the exclusive-or circuit 406 output is 1 (HIGH). For example, if the predetermined period of time is 10 ns and for 5 ns the output of the exclusive-or circuit 406 is 1, the output voltage 412 is 50 percent of the supply voltage VCC. However, if the output of the exclusive-or circuit 406 is 1 for 3 ns, then the output voltage 412 is 30 percent of the supply voltage VCC. In other words, the average exclusive-or output is proportional to the sub-period of time of the predetermined period of time that the output of the exclusive-or circuit 406 is 1 (HIGH) and the sub-period of time of the predetermined period of time that the output of the exclusive-or circuit 406 is 0 (LOW).

The receiver processor 404 is any type of processor, controller, microcontroller, and/or microprocessor with an architecture optimized for processing the output voltage. For example, the processor 404 can be a digital signal processor (DSP), a central processing unit (CPU), a reduced instruction set computing (RISC) core such as an advanced RISC machine (ARM) core, a mixed signal processor (MSP), etc. As indicated, the processor can be a special purpose processor integrated with the delay detector 402, or as a general processor/controller with a data communications link to the delay detector 402.

The processor 404, in an example, is configured to determine the position of the piston 106 based on the level of the output voltage 412, and thus, based on the phase difference between the transmit electromagnetic waveform 222 and the return electromagnetic waveform 224. For example, if the output voltage 412 is 30 percent of the supply voltage VCC, then the piston 106 is extended 30% of its maximum displacement.

Figure 5:
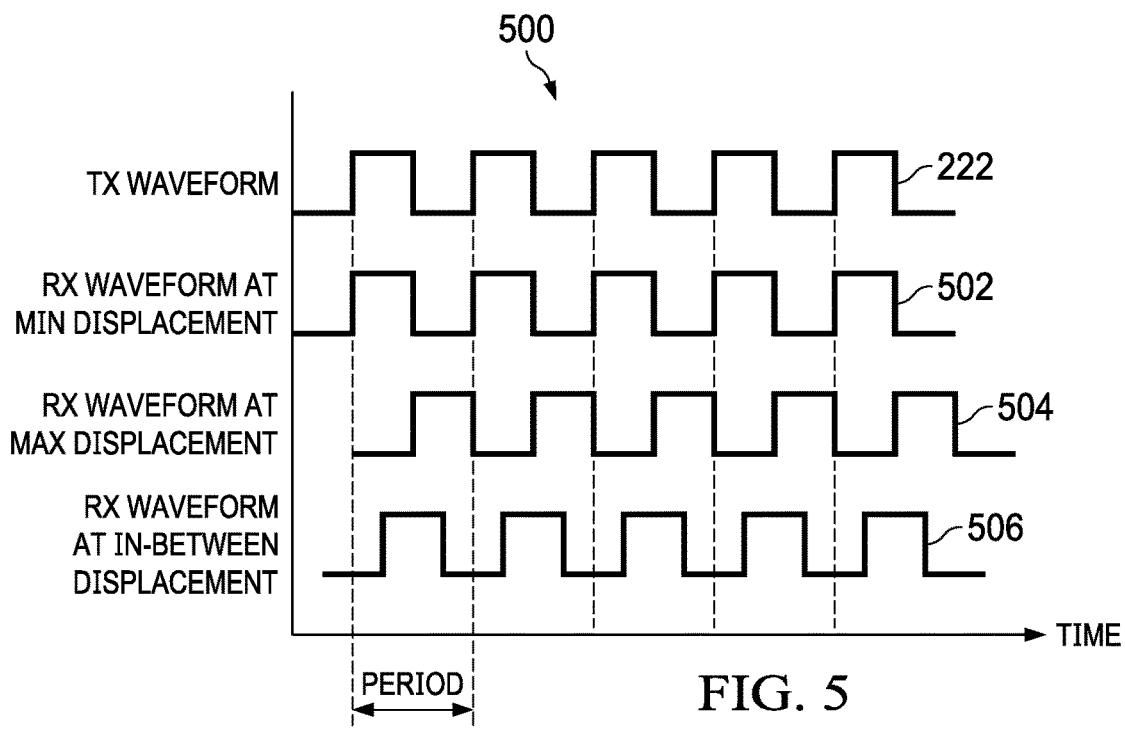
FIG. 5 shows an illustrative timing diagram of an illustrative transmit electromagnetic waveform and various return electromagnetic waveforms in accordance with various examples.

FIG. 5 shows an illustrative timing diagram 500 of an illustrative transmit electromagnetic waveform 222 and various return electromagnetic waveforms 502-506 in accordance with various examples. As shown in FIG. 5, the example transmit electromagnetic waveform 222 is a digital waveform that is transmitted with a predetermined period and frequency that, as discussed above, is based on the maximum displacement of the piston 106. When the piston 106 is fully retracted (at a minimum displacement), then the edges of the return electromagnetic waveform 502 align with the edges of the transmit electromagnetic waveform 222. Therefore, there is no phase shift between the transmit electromagnetic waveform 222 and the return electromagnetic waveform 502, because the transmit electromagnetic waveform 222 does not have to travel any distance to reach extended end 122. Thus, as discussed above, the output of the exclusive-or circuit 406 is 0 (LOW) the entire time the piston 106 is at the minimum displacement.

However, because the amount of time for the transmit electromagnetic waveform 222 to travel the maximum displacement of the piston 106 is half the period of the transmit electromagnetic waveform 222, when the piston 106 is at maximum displacement, the return electromagnetic waveform 504 is exactly 180 degrees out of phase with the transmit electromagnetic waveform 222. In other words, as the transmit electromagnetic waveform 222 transitions from 0 (LOW) to 1 (HIGH), the return electromagnetic waveform 504 transitions from 1 (HIGH) to 0 (LOW) and as the transmit electromagnetic waveform 222 transitions from 1 (HIGH) to 0 (LOW), the return electromagnetic waveform 504 transitions from 0 (LOW) to 1 (HIGH). Therefore, as discussed above, the output of the exclusive-or circuit 406 is 1 (HIGH) the entire time the piston 106 is at the maximum displacement.

If the piston 106 is located between the minimum displacement and the maximum displacement, then the return electromagnetic waveform 506 is between 0 degrees and 180 degrees out of phase with the transmit electromagnetic waveform 222 and proportional to the position of the piston 106, as discussed above. Hence, because the frequency of the transmit electromagnetic waveform 222 is based on the maximum displacement of the piston 106 such that the transmit electromagnetic waveform 222 is 180 degrees out of phase with the return electromagnetic waveform 224 when the piston is at maximum displacement, the delay detector 402 generates an output voltage 412 that is proportional to the piston 106 position based on the output of the exclusive-or circuit 406.

Because the linear actuator 100 utilizes, in an example, a high frequency (e.g., 500 MHz) signal to determine the position of the piston 106, the position of the piston 106 can be updated at a relatively quickly. For example, the piston position determination system 110 can update the position of the piston 106 at almost the speed of the clock signal. In other words, the position of the piston 106 can be determined continuously with only a few Nano seconds between position determinations. This is not possible in other linear actuators. Thus, such linear actuator 100 can be utilized in technologies that other actuators cannot. For example, linear actuator 100 can be utilized in automobiles as a fast suspension position sensor to determine the position of the sliding suspension/cylinder (e.g., piston) in an automobile.

Figure 6:
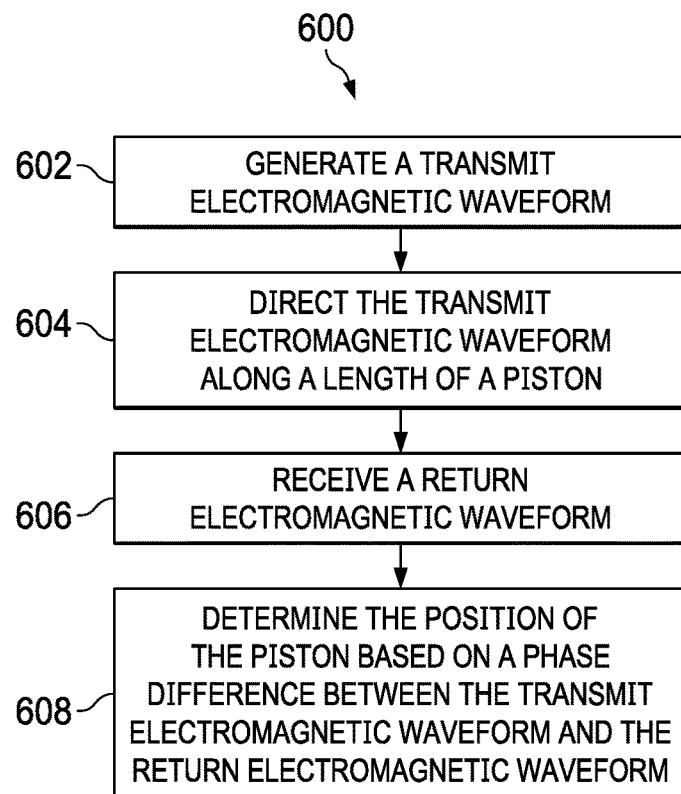
FIG. 6 shows an illustrative flow diagram of a method of determining a position of a piston in a linear actuator in accordance with various examples.

FIG. 6 shows an illustrative flow diagram of a method 600 of determining a position of a piston in a linear actuator in accordance with various examples. Though depicted sequentially as a matter of convenience, at least some of the actions shown can be performed in a different order and/or performed in parallel. Additionally, some examples may perform only some of the actions shown. In some examples, at least some of the operations of the method 600, as well as other operations described herein, are performed by the transmitter 202 (including the PLL 330, a DLL, and/or the crystal oscillator) and/or the receiver 204 (including the delay detector 402 and/or the receiver processor 404) and implemented in logic and/or by a processor implementing instructions stored on a non-transitory computer readable medium.

The method 600 begins in block 602 with generating a transmit electromagnetic waveform. For example, the transmitter 202 can generate the transmit electromagnetic waveform 222 with a period that is double the amount of time for the transmit electromagnetic waveform to travel the maximum displacement of a piston (e.g., piston 106). In block 604, the method 600 continues with directing the transmit electromagnetic waveform along a length of the piston. For example, the transmitter 202 can transmit the transmit electromagnetic waveform 222 so that the transmit electromagnetic waveform 222 travels the length of piston 106 to the extended end 122.

The method 600 continues in block 606 with receiving a return electromagnetic waveform. For example, the receiver 204 can receive the return electromagnetic waveform 224 that includes the transmit electromagnetic waveform 122 after travelling to the extended end 122 of the piston 106 and returning to the receiver 204. In block 608, the method 600 continues with determining the position of the piston based on a phase difference between the transmit electromagnetic waveform and the return electromagnetic waveform. For example, the receiver 204 can determine the position of piston 106 based on the phase difference between the transmit electromagnetic waveform 222 and the return electromagnetic waveform 224. In some examples, the phase difference between the transmit electromagnetic waveform and the return electromagnetic waveform is determined by performing an exclusive-or function on the transmit electromagnetic waveform and the return electromagnetic waveform.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A linear actuator, comprising:
a piston composed of a material, the piston configured to linearly extend and retract;
a transmitter configured to generate a transmit electromagnetic waveform and direct the transmit electromagnetic waveform through the material along a length of the piston and directly to a receiver; and
wherein the receiver is configured to:
receive a return electromagnetic waveform that includes the transmit electromagnetic waveform after travelling through the material to an extended end of the piston and returning to the receiver; and
determine a position of the piston based on a time of flight (TOF) difference between the transmit electromagnetic waveform and the return electromagnetic waveform.

2. The linear actuator of claim 1, wherein the transmitter is configured to generate the transmit electromagnetic waveform at a frequency that corresponds with a maximum displacement of the piston.

3. The linear actuator of claim 1, wherein the transmitter is configured to generate the transmit electromagnetic waveform with a period that is double an amount of time for the transmit electromagnetic waveform to travel a maximum displacement of the piston.

4. The linear actuator of claim 3, wherein the receiver is configured to perform an exclusive-or function on the transmit electromagnetic waveform and the return electromagnetic waveform to determine the TOF difference between the transmit electromagnetic waveform and the return electromagnetic waveform.

5. The linear actuator of claim 4, wherein the receiver is configured to generate an output voltage, wherein the output voltage is:
in response to a determination that an output of the exclusive-or function is 1 for a predetermined period of time, equal to a supply voltage;
in response to a determination that the output of the exclusive-or function is 0 for the predetermined period of time, equal to zero.

6. The linear actuator of claim 1, wherein the material of the piston is composed of a conductive material.

7. A receiver, comprising:
a delay detector configured to:
receive a return electromagnetic waveform that includes a transmit electromagnetic waveform after travelling through a material of a piston along a length of the piston to an extended end of the piston of a linear actuator; receive directly the transmit electromagnetic waveform; and
determine a TOF difference between the transmit electromagnetic waveform and the return electromagnetic waveform; and
a processor configured to determine a position of the piston based on the phase difference.

8. The receiver of claim 7, wherein the delay detector including an exclusive-or circuit configured to perform an exclusive-or function on the transmit electromagnetic waveform and the return electromagnetic waveform to determine the TOF difference.

9. The receiver of claim 8, wherein the delay detector is configured to generate an output voltage that is:
in response to an output of the exclusive-or circuit being 1 for an entire predetermined period of time, equal to a supply voltage; and
in response to the output of the exclusive-or circuit being 0 for the entire predetermined period of time, equal to zero.

10. The receiver of claim 7, wherein the return electromagnetic waveform has a frequency that corresponds with a maximum displacement of the piston.

11. The receiver of claim 7, wherein the return electromagnetic waveform has a period that is double an amount of time for the transmit electromagnetic waveform to travel a maximum displacement of the piston.

12. A method of determining a position of piston in a linear actuator, comprising:
generating a transmit electromagnetic waveform with a frequency corresponding to a time of flight for the transmit electromagnetic waveform to travel through a material of the piston a maximum displacement of the piston;
directing the transmit electromagnetic waveform through the material of the piston along a length of the piston;
receiving a return electromagnetic waveform that includes the transmit electromagnetic waveform after travelling through the material of the piston to an extended end of the piston and returning to a receiver;
receiving directly the transmit electromagnetic waveform; and
determining the position of the piston based on a TOF difference between the transmit electromagnetic waveform and the return electromagnetic waveform.

13. The method of claim 12, wherein a period of the transmit electromagnetic waveform is double an amount of time for the transmit electromagnetic waveform to travel the maximum displacement of the piston.

14. The method of claim 12, wherein the TOF difference between the transmit electromagnetic waveform and the return electromagnetic waveform is determined by performing an exclusive-or function on the transmit electromagnetic waveform and the return electromagnetic waveform.

* * * * *